Figure 1:
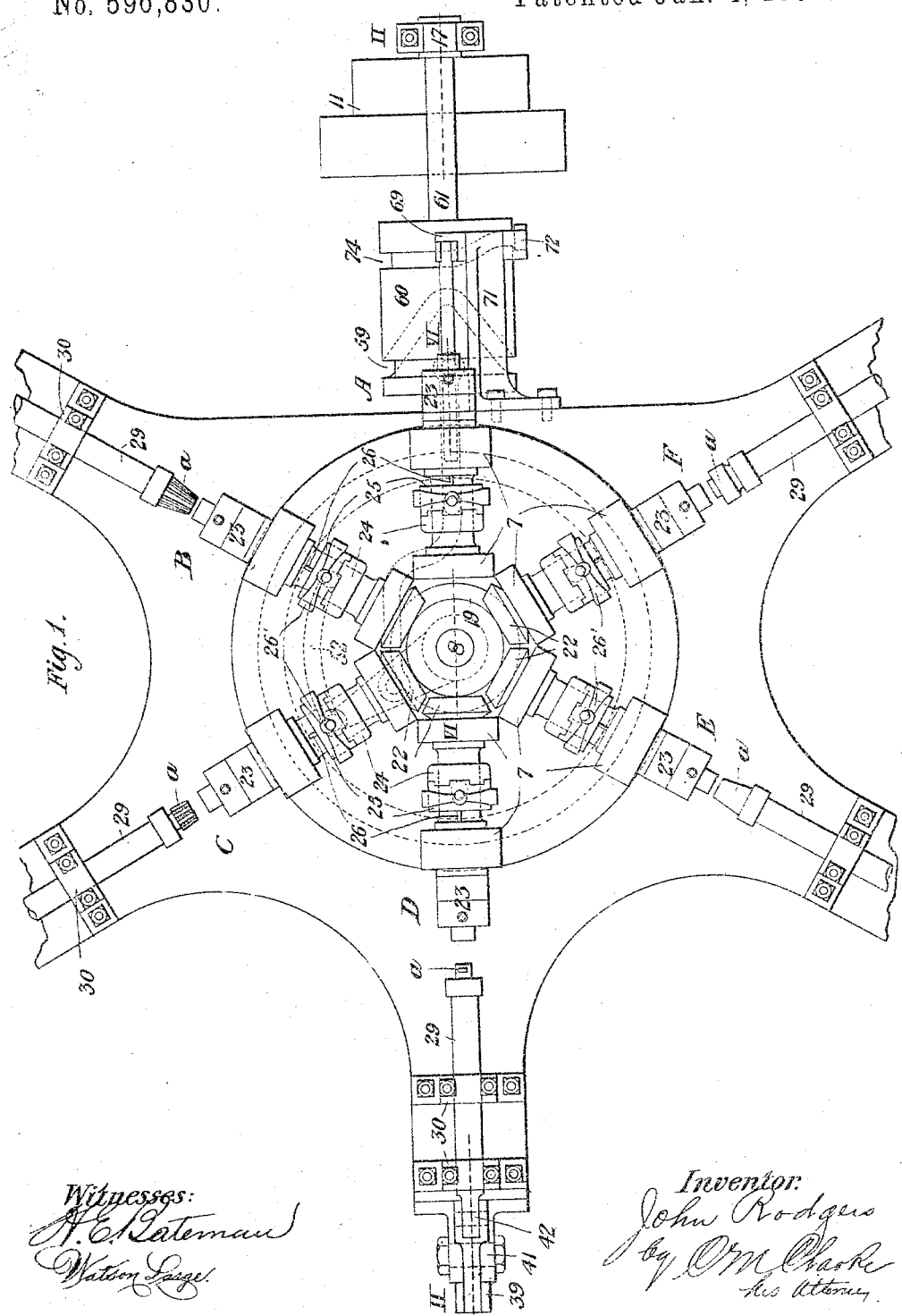

(No Model.)

J. RODGERS.
TURRET LATHE.

No. 596,830.

4 Sheets—Sheet 1.

Patented Jan. 4, 1898.

Witnesses:
H. E. Bateman
Watson Large

Inventor:
John Rodgers
by O. M. Clarke
his Attorney

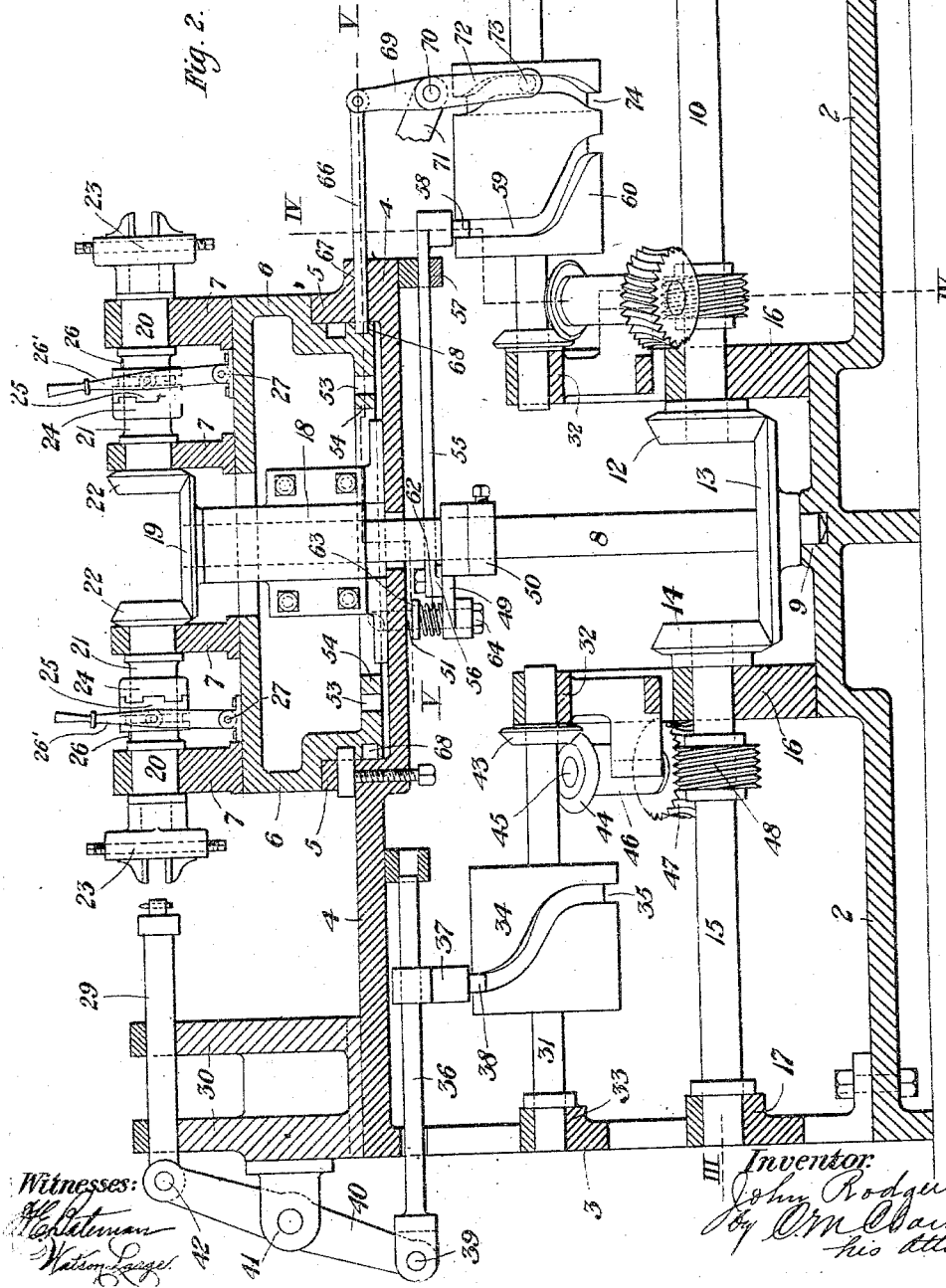

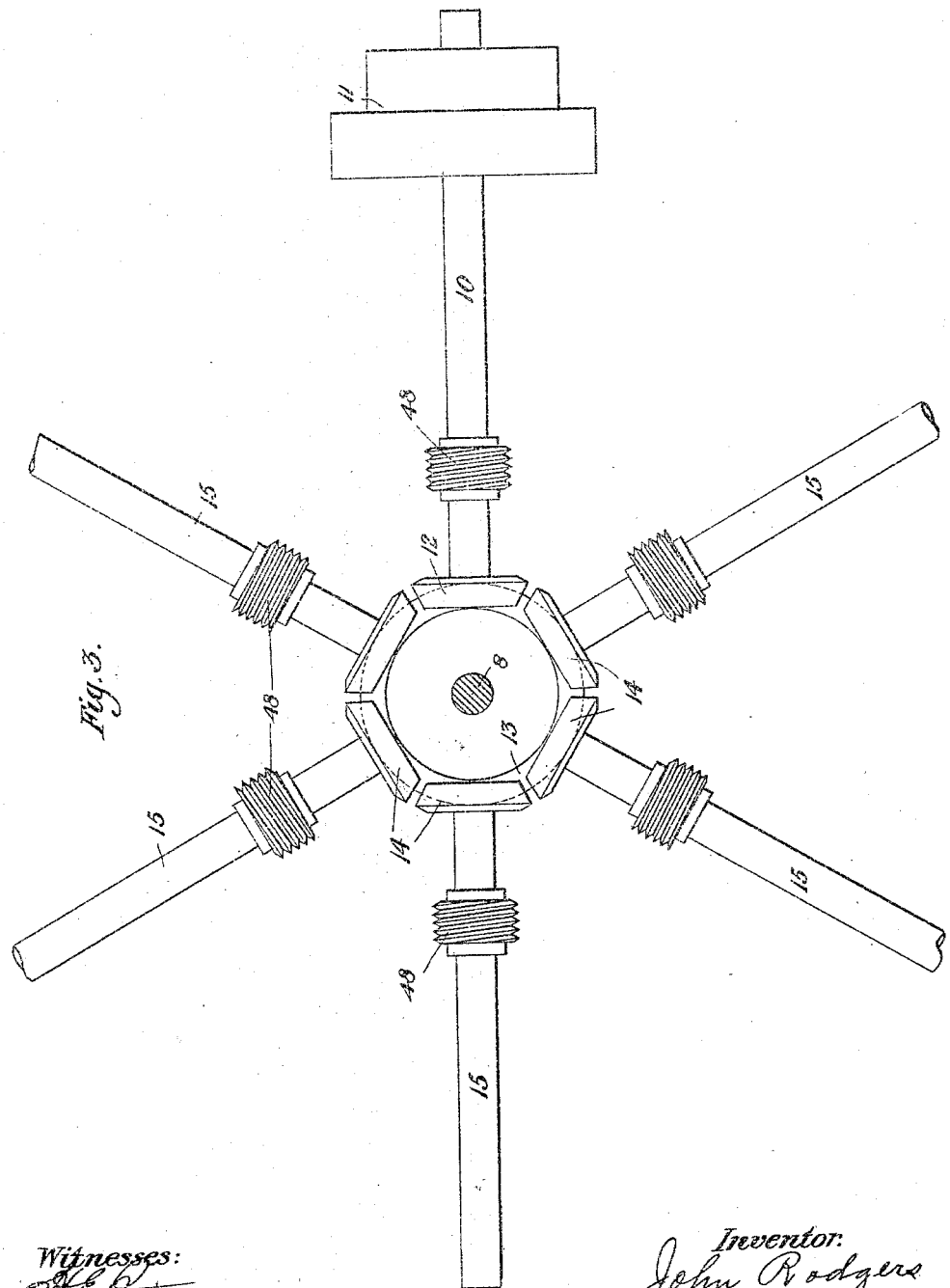

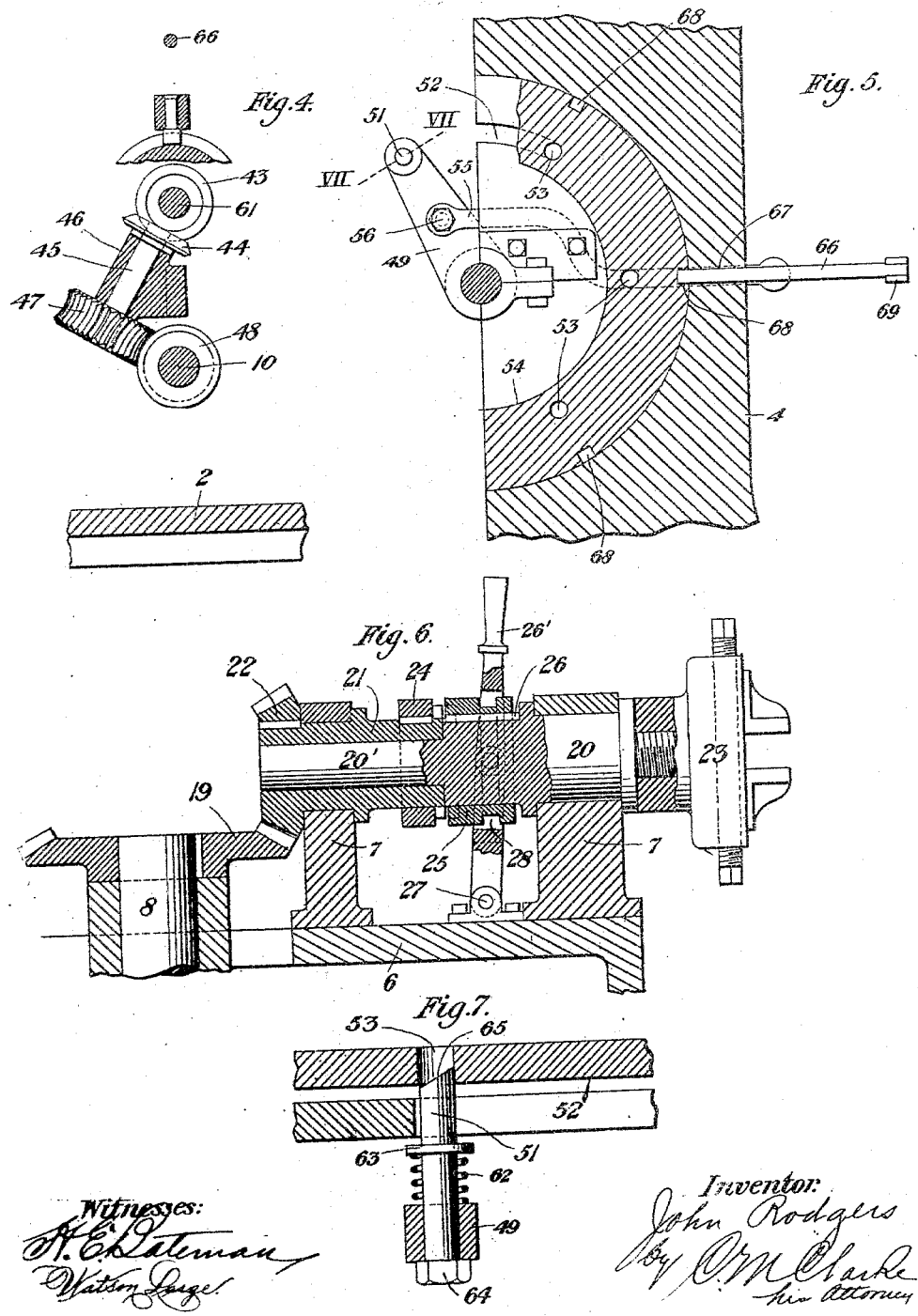

UNITED STATES PATENT OFFICE.

JOHN RODGERS, OF WILMERDING, PENNSYLVANIA, ASSIGNOR OF ONE-HALF TO ABRAM G. HOLMES, OF PITTSBURG, PENNSYLVANIA.

TURRET-LATHE.

SPECIFICATION forming part of Letters Patent No. 596,830, dated January 4, 1898.

Application filed March 19, 1897. Serial No. 628,376. (No model.)

*To all whom it may concern:*

Be it known that I, JOHN RODGERS, a citizen of the United States, residing at Wilmerding, in the county of Allegheny and State of Pennsylvania, have invented or discovered a new and useful Improvement in Turret-Lathes, of which the following is a full, clear, and exact description, reference being had to the accompanying drawings, forming part of this application, in which—

Figure 1 a plan view of my improved turret-lathe. Fig. 2 is a central longitudinal section thereof, taken on the line II II of Fig. 1. Fig. 3 is a plan view showing the arrangement of the main power and driving shafts, the upper part of the machine having been removed above the line III III of Fig. 2. Fig. 4 is a cross-section taken on the line IV IV of Fig. 2. Fig. 5 is a cross-section taken on the line V V of Fig. 2. Fig. 6 is a sectional detail view of one of the chuck-spindles indicated by the line VI VI of Fig. 1. Fig. 7 is a cross-section through the end of the shifting lever and tables indicated by the line VII VII of Fig. 5.

My invention consists of an improvement in turret-lathes for the successive manipulation of lathework, and is designed for the purpose of securing greater simplicity in the construction of the machine and efficiency and rapidity in its manipulation and action, as shall be hereinafter set forth.

Referring to the drawings, 2 is a main base upon which by suitable side framework 3 is supported the main stationary table 4. At its center the table 4 is provided with a circular raised bearing-track 5, upon which is supported the upper circular revolving turret 6, upon which are radially arranged the various revolving chuck-holders, mounted in bearings 7, secured to the turret 6. A vertical shaft 8 is mounted centrally of the machine, having a step-box bearing 9 in the base 2, and this shaft serves to receive motion from a main driving-shaft 10, provided with a stepped pulley 11, through bevel-wheels 12 13, secured to the shafts 10 and 8, respectively, and to distribute the power by driven bevel-wheels 14 to a series of lateral horizontal shafts 15. Suitable bearings for the shafts are provided in the pillow-blocks 16 17, mounted on the base and side frame. A vertical bearing 18, secured to the center of the upper table 4, serves to hold the shaft 8 in a central upright position, and at its top the shaft 8 is provided with a master bevel-wheel 19. The chuck-holders consist of a two-part shaft 20 21, the part 20 having a reduced extension 20' passing through the hollow shaft 21, to which is keyed a bevel-wheel 22, meshing into the wheel 19. At its other end the shaft 20 is provided with a chuck 23, of any approved design, adapted to receive and hold the piece to be operated upon. To the hollow driven shaft 21 is affixed a clutch 24, a corresponding clutch 25 being slidingly mounted by a spline 26 upon the shaft 20 and adapted to engage and disengage with the clutch 24.

A hand-lever 26', pivoted to the top of the turret 6 at 27, engages an annular groove 28 of the clutch 25, by which means the clutch is thrown into and out of gear.

In the machine illustrated in the drawings I have shown six chuck-holders and chucks equally arranged and spaced, and at five of the positions opposite the chucks are located reciprocating stationary (as to rotary motion) tool-holders 29, mounted in upright bearings 30, secured upon the table 4. These holders are provided at their inner ends with cutting-tools *a*, which are advanced toward and withdrawn from the chucks in the manner I shall now describe.

It will be seen, Fig. 3, that from the main power-shaft 10 motion is imparted through gearing 12 13 14 to shafts 8 and 15, each of the shafts 15 corresponding in position to one of the tool-holders 29. Above each of such shafts 15 is located a short counter-shaft 31, suitably supported in bearings 32 33, upon which is mounted a cam 34, provided with a cam-groove 35. Above the counter-shaft 31 is mounted a reciprocating rod 36, provided with a cross-head 37 and finger 38, projecting into the cam-groove 35, the outer end of the rod being pivotally connected at 39 to the lower end of a lever 40, pivoted at its middle to a bracket 41 and at the upper end pivotally secured to the outer end of the tool-holder 29 at 42.

To the shaft 31 is secured a miter-wheel 43, into which meshes a similar miter-wheel 44, mounted on the upper end of a short shaft 45, having a bearing at 46 in a bracket extended from the main frame. To the lower end of the shaft 45 is secured a worm-wheel 47, and upon each shaft 15 is a worm 48, intermeshing therewith and by which the worm-wheel, shaft, miter-wheels, shaft 31, and cam are operated. Inasmuch as the initial speed of the power-shaft and lateral shafts 15 is high it will be seen that by this means of transmission the speed will be greatly reduced and the power correspondingly increased.

For the purpose of rotating the turret a partial revolution corresponding to the distance between any two operative positions I have provided a swinging lever 49, journaled at its inner end on the shaft 8 with a supporting-collar 50. At its outer end is mounted a finger 51, projecting up through an annular slot 52 into one of the holes 53 in the inwardly-projecting flange 54 of the turret 6, the holes 53 being regularly spaced and located to correspond to the position and number of the chuck-holders. The lever 49 has a swinging motion through the arc of a circle corresponding to the distance between two positions of the chuck-holders and is operated by a connecting-rod 55, pivotally secured to the lever at 56, supported in bearing 57 and having at its outer end a finger 58 in engagement with a cam-groove 59 on the cam 60, supported on the shaft 61, the groove being so designed as to cause the rod 55 to travel forward and back, thereby operating the lever through the desired arc. The pin 51 is so mounted in the end of the lever 49 as to be capable of vertical movement and is provided with a coiled spring 62 surrounding the pin, resting on the upper side of the lever and bearing against a collar 63 of the pin so as to raise it into an operative position to engage the hole 53, the motion being limited by a nut 64. At its top the pin 51 is beveled on the back side at 65, whereby it will be automatically forced down and out of engagement with the hole on the back travel of the lever, the spring causing it to rise and enter the next hole when in register.

For the purpose of locking the turret 6 in position and so holding it during the operation of the various tools, a locking-bolt 66 is mounted at the front of the machine, passing through a bearing 67 in the upper table and entering one of the locking-holes 68 in the outer edge of the turret, corresponding in number and regularity of intervening space to the holes 53. At its outer end this bolt is pivotally connected to a reciprocating lever 69, secured to a rock-shaft 70, pivoted in a bearing 71, secured to the framework of the machine, a cam-lever 72 projecting downwardly alongside the cam 60 and provided with a pin 73, entering the cam-groove 74, by which means the locking-bolt is operated, the cam-groove 74 being so designed as to insert and withdraw the locking-bolt at the beginning and end of the period of rest of the turret.

The cam 60 is mounted on its shaft and the shaft 61 is mounted in bearings secured to the frame of the machine in a manner similar to the shafts 31, and motion is imparted to it at the same speed and through the similar mechanism of worm 48, worm-wheel 47, and gearing 44 43 as employed to operate the shafts 31, as already described.

In the operation of my machine the blanks to be operated on are inserted in the chucks 23 of the lathe successively as the turret is rotated, the operator occupying a position at the front of the machine designated by the letter A. The blank is then carried around by the revolving turret, the clutch having been thrown into engagement whereby it is caused to rotate until arriving at the position B, when the turret will be stopped by the termination of throw of lever 49. The locking-bolt 66 is then inserted. The tool-carrying shafts 29 will then be advanced and the blank while rotating will be acted on by the tool until the shaft 29 has advanced to the limit of its stroke due to the cam 34, when the tool will then recede and the blank will be advanced to the next position C, and in succession to positions D, E, and F, the operation being similar in each case, but a different tool being used on each successive tool-holding shaft, whereby the blank is subjected to a different operation in succession, until it finally arrives again at the position A, when the clutch will be thrown out of engagement and the finished blank will be removed by the operator and a new one inserted. It will then be seen that the operation is continuous, and that each of the five chucks will contain blanks in different stages of operation, the action being entirely automatic from start to finish.

Variations may be made in the design, proportions, and arrangement of my machine without departing from my invention, and the numbers of chuck-holders and tool-shafts may be varied to suit different requirements of use, and all such changes and variation as may be made by the skilled mechanic are contemplated by me and considered as part of my invention.

What I claim is—

1. A turret-lathe provided with a main table, a rotating turret mounted centrally thereon, means for intermittently rotating the turret a partial revolution, laterally arranged, equally-spaced chuck-supporting shafts mounted on the turret formed in two parts with connecting clutch mechanism, a central vertical power-shaft provided with a bevel gear-wheel meshing into bevel gear-wheels mounted on the inner ends of the chuck-supporting shafts, and reciprocating tool-holders with mechanism for advancing toward and withdrawing from the chucks, substantially as set forth.

2. In a turret-lathe provided with a main table, a rotating turret mounted centrally thereon, means for intermittently rotating the turret a partial revolution, reciprocating tool-holders, and turret-locking mechanism; a main power-shaft with means for imparting motion from a prime mover and a bevel-wheel on its inner end, a central vertical power-distributing shaft provided with a bevel-wheel in engagement with the main power-shaft bevel-wheel, lateral driving-shafts provided with bevel-wheels in engagement with the bevel-wheel on the central shaft, secondary driving-shafts located above the lateral driving-shafts, and intervening driving mechanism by which motion is imparted from the lateral driving-shafts to the secondary driving-shafts substantially as set forth.

3. In a turret-lathe provided with a main table, a rotating turret mounted centrally thereon, means for intermittently rotating the turret a partial revolution, reciprocating tool-holders, and turret-locking mechanism; the combination therewith of a main power-shaft with means for imparting motion from a prime mover, and a bevel-wheel on its inner end, a central vertical power-distributing shaft provided with a bevel-wheel in engagement with the main power-shaft bevel-wheel, lateral driving-shafts provided with bevel-wheels in engagement with the bevel-wheel on the central shaft, secondary driving-shafts located above the lateral driving-shafts, worm gear-wheels mounted on the lateral driving-shaft and main power-shaft respectively; worm pinion-wheels in engagement therewith mounted on the ends of intervening shafts having a bevel-wheel in mesh with a corresponding bevel-wheel mounted in the secondary driving-shafts, with bearings for the intervening shafts, substantially as set forth.

4. In a turret-lathe provided with a rotating chuck-supporting turret, means for rotating the chucks, and means for holding the turret stationary at operative positions of the chucks; a reciprocating tool-holder mounted in bearings opposite the chucks at such operative positions, a pivoted lever connected to the tool-holder and to an operating-rod provided with a cam-finger, and a cam provided with a groove engaging the finger, substantially as set forth.

5. In a turret-lathe provided with a main stationary table, a rotating chuck-supporting turret, means for rotating the chucks consisting of bevel-wheels mounted on the inner ends of the chuck-supporting shafts in mesh with a driving double wheel mounted on the top of a vertical driving-shaft; a shifting lever pivotally mounted on the vertical shaft provided with a pin projecting through an annular slot in the table and designed to engage holes in the bottom of the turret with means for operating the lever, substantially as set forth.

6. In a turret-lathe provided with a main stationary table, a rotating chuck-supporting turret, means for rotating the chucks consisting of bevel-wheels mounted on the inner ends of the chuck-supporting shafts in mesh with a driving bevel-wheel mounted on the top of a vertical driving-shaft, a shifting lever pivotally mounted on the vertical shaft provided with a pin having a cushion-spring to permit of vertical movement projecting through an annular slot in the table and designed to engage holes in the bottom of the turret, and a rod, pivotally connected to the shifting lever, mounted in bearings in the table provided with a cam-finger and an operating-cam provided with a groove for engaging the finger, substantially as set forth.

7. In a turret-lathe provided with a main stationary table and a rotating chuck-supporting turret provided with locking-holes in its edge and an operating-cam designed to impart motion to the turret-shifting mechanism; a locking-bolt mounted in the main table pivotally connected to a crank-arm mounted on a rock-shaft supported in bearings secured to the table and provided with a crank-arm having a finger engaged by a cam-groove in the shifting cam, substantially as set forth.

8. In a turret-lathe in combination with a vertical shaft a main driving-shaft and lateral shafts provided with bevel gear-wheels in mesh with a bevel secured to the vertical shaft, and a series of lateral cam-shafts and cams thereon located above the main driving and lateral shafts; power-transmitting mechanism consisting of worm-wheels secured to the driving-shafts, worm pinion-wheels in mesh therewith, mounted on the ends of shafts having bevel-wheels in mesh with bevel-wheels secured to the cam-shafts, substantially as set forth.

9. In a turret-lathe provided with a revolving turret and a central vertical power-imparting shaft provided with a driving bevel-wheel on the top; chuck supporting and rotating mechanism consisting of a hollow shaft having on its inner end a bevel-wheel in mesh with a driving-bevel, a fixed clutch on its outer end, a chuck-supporting shaft provided with a reduced extension projecting into the hollow shaft, provided with a chuck on its outer end, and a sliding clutch on its inner end, designed to engage the fixed clutch with mechanism for operating the clutch, substantially as set forth.

10. The combination in a turret-lathe of a main table, a rotating turret mounted centrally thereon, equally-spaced chuck-supporting shafts mounted on the turret formed in two parts with connecting clutch mechanism, a central vertical power-shaft provided with a bevel gear-wheel meshing into bevel gear-wheels mounted on the inner ends of the chuck-supporting shafts, reciprocating tool-holders mounted in bearings opposite the chucks at the operative positions, pivoted levers connected to the tool-holders and to operating-rods provided with cam-fingers, cams mounted on lateral shafts and provided with grooves engaging the fingers, and bevel-wheel and worm-gearing connecting such lateral shafts with main lateral driving-shafts having bevel-wheels in mesh with a main driving bevel-wheel on the central vertical power-shaft, substantially as set forth.

11. The combination in a turret-lathe of a main table, a rotating turret mounted centrally thereon, equally-spaced chuck-supporting shafts mounted on the turret formed in two parts with connecting clutch mechanism, a central vertical power-shaft provided with a bevel gear-wheel meshing into bevel gear-wheels mounted on the inner ends of the chuck-supporting shafts, reciprocating tool-holders mounted in bearings opposite the chucks at the operative positions, pivoted levers connected to the tool-holders and to operating-rods provided with cam-fingers, cams mounted on lateral shafts and provided with grooves engaging the fingers, bevel-wheel and worm-gearing connecting such lateral shafts with main lateral driving-shafts having bevel-wheels in mesh with a main driving bevel-wheel on the central vertical power-shaft and a shifting lever pivotally mounted on the vertical shaft provided with a pin projecting through an annular slot in the table and designed to engage holes in the bottom of the turret with a connecting-rod having a finger engaged by a groove of a cam on one of the cam-shafts, substantially as set forth.

12. The combination in a turret-lathe of a main table, a rotating turret mounted centrally thereon, equally-spaced chuck-supporting shafts mounted on the turret formed in two parts with connecting clutch mechanism, a central vertical power-shaft provided with a bevel gear-wheel meshing into bevel gear-wheels mounted on the inner ends of the chuck-supporting shafts, reciprocating tool-holders mounted in bearings opposite the chucks at the operative positions, pivoted levers connected to the tool-holders and to operating-rods provided with cam-fingers, cams mounted on lateral shafts and provided with grooves engaging the fingers, bevel-wheel and worm-gearing connecting such lateral shafts with main lateral driving-shafts having bevel-wheels in mesh with a main driving bevel-wheel on the central vertical power-shaft and a locking-bolt mounted in the main table adapted to enter locking-holes in the edge of the rotating turret and connected to a pivoted crank-arm having a finger engaged by a cam-groove in a shifting cam on one of the cam-shafts, substantially as set forth.

In testimony whereof I have hereunto set my hand this 9th day of January, 1897.

JOHN RODGERS.

Witnesses:
J. V. McCORMICK,
C. M. CLARKE.